United States Patent

Iacona et al.

[11] Patent Number: 5,887,348
[45] Date of Patent: Mar. 30, 1999

[54] HEAD FOR STRING TRIMMER

[76] Inventors: Fernando R. Iacona, 29-63 215 Pl., Bayside, N.Y. 11360; Ignazio M. Iacona, 50 Bellwood Dr., New Hyde Park, N.Y. 11401

[21] Appl. No.: 977,168

[22] Filed: Nov. 24, 1997

Related U.S. Application Data

[63] Continuation-in-part of Ser. No. 709,193, Aug. 23, 1996, Pat. No. 5,758,424.

[51] Int. Cl.⁶ .................................................. B26B 27/00
[52] U.S. Cl. ........................ 30/276; 30/347; 56/12.7; 56/294
[58] Field of Search ................ 30/276, 347; 56/12.7, 56/295, 294

[56] References Cited

U.S. PATENT DOCUMENTS

| | | | |
|---|---|---|---|
| 3,708,967 | 1/1973 | Geist et al. | 56/12.7 |
| 4,035,912 | 7/1977 | Ballas et al. | 30/276 |
| 4,043,037 | 8/1977 | Okamoto et al. | 30/276 |
| 4,062,114 | 12/1977 | Luick | 30/276 |
| 4,062,115 | 12/1977 | Lee | 30/276 |
| 4,097,991 | 7/1978 | Proulx | 30/276 |
| 4,104,797 | 8/1978 | Ballas | 30/276 |
| 4,145,809 | 3/1979 | Proulx | 30/276 |
| 4,190,954 | 3/1980 | Walto | 30/347 |
| 4,199,926 | 4/1980 | Petty | 30/276 |
| 4,203,212 | 5/1980 | Proulx | 30/276 |
| 4,236,312 | 12/1980 | Foster et al. | 30/276 |
| 4,244,103 | 1/1981 | Snarr | 30/276 |
| 4,259,782 | 4/1981 | Proulx | 30/276 |
| 4,271,595 | 6/1981 | Rahe | 30/347 |
| 4,290,200 | 9/1981 | Lombard | 30/276 |
| 4,301,642 | 11/1981 | Thurber | 30/276 |
| 4,335,510 | 6/1982 | Close et al. | 30/276 |
| 4,571,831 | 2/1986 | White, III | 30/276 |
| 4,644,655 | 2/1987 | Bottamiller et al. | 30/276 |
| 4,651,421 | 3/1987 | Zerrer | 30/347 |
| 4,685,279 | 8/1987 | Gullett | 30/276 |
| 4,756,146 | 7/1988 | Rouse | 30/276 |
| 4,805,306 | 2/1989 | Baba | 30/276 |
| 4,852,258 | 8/1989 | Foster | 30/276 |
| 4,905,465 | 3/1990 | Jones et al. | 30/276 |
| 4,989,321 | 2/1991 | Hoffmann | 30/347 |
| 5,010,649 | 4/1991 | Hoffmann | 30/276 |
| 5,020,224 | 6/1991 | Haupt | 30/276 |
| 5,023,998 | 6/1991 | Masciarella et al. | 30/276 |
| 5,276,969 | 1/1994 | Luick | 30/276 |
| 5,303,476 | 4/1994 | Tuggle | 30/276 |
| 5,398,416 | 3/1995 | Mackey | 30/276 |
| 5,433,006 | 7/1995 | Taguchi | 30/276 |
| 5,526,572 | 6/1996 | Sugihara et al. | 30/276 |
| 5,651,418 | 7/1997 | Jerez | 30/276 |

FOREIGN PATENT DOCUMENTS 8 302 111   1/1985   Netherlands .

*Primary Examiner*—M. Rachuba
*Attorney, Agent, or Firm*—Anthony J. Casella; Gerald E. Hespos; Ludomir A. Budzyn

[57] ABSTRACT

A cutting head for a string trimmer is provided which accommodates any string gauge thickness and may be easily and quickly re-threaded upon failure of a string previously disposed therein. Clamping members are provided to clamp the strings within the cutter head, with the clamping force being provided by springs and centrifugally generated moments. The clamping members are capable of generating two degrees of clamping force. The lesser degree of clamping force can be overcome by a string forcibly inserted into the cutting head. Alternatively, the clamping members can be formed to pinch the string, with a constant degree of pinching force being applied to the string.

9 Claims, 4 Drawing Sheets

HEAD FOR STRING TRIMMER

This application is a continuation-in-part application of U.S. Ser. No. 08/709,193 filed Aug. 23, 1996, now U.S. Pat. No. 5,758,424.

BACKGROUND OF THE INVENTION

1. Field of the Invention

This invention is directed to garden string trimmers, and more particularly, to a cutting head for string trimmers which can be easily re-strung.

2. Description of the Prior Art

String trimmers are well known in the prior art. The typical prior art string trimmer comprises a planar cutting head with at least two radially extending strings which is rotated at a sufficient velocity to cause the strings to stiffen. The strings are formed usually from plastic and are sufficiently strong enough to cut through blades of grass, hedges, and other vegetation in a stiffened state. The strings, however, will break upon hitting stone, concrete or some other hard material commonly found in a garden setting.

String trimmers are most often used to cut vegetation along a border of a flower bed or plot of grass which is adjacent to a sidewalk, driveway, or solid structure. Since the cutting head rotates at a speed that makes the strings nearly imperceptible, an operator of the string trimmer is not always able to see that the strings may come into contact with a hard surface and react accordingly. As a result, strings on a string trimmer are commonly broken. Prior art designs of string trimmer cutting heads have attempted to ease the re-stringing process which may be quite time consuming. One type of cutter head design includes an array of grooves and cut-outs in the hub of the cutting head which act to anchor a string therein as in U.S. Pat. No. 4,190,954 to Walto entitled "CUTTING HEAD" which issued Mar. 4, 1980, U.S. Pat. No. 4,905,465 to Jones, et al. entitled "ROTARY CUTTING MEMBER FOR USE WITH LAWN MOWERS AND THE LIKE" which issued on Mar. 6, 1990, and U.S. Pat. No. 5,023,998 to Masciarella, et al. entitled "FILAMENT HOLDER FOR A ROTATING FILAMENT VEGETATION CUTTER" which issued Jun. 18, 1991. This type of cutting head has several drawbacks. First, the grooves and cut-outs include a number of sharp corners which, in time, fray, weaken and break the string disposed therein. Second, a relatively thin string can only be used due to the numerous twists and turns the string must pass through. As a result, the thinner string breaks more often than thicker counter parts and requires repeated replacement. Third, disassembly of the cutter head is required to re-string the cutter head with subsequent bending and manipulation of the string to conform with the grooves and cut-outs formed therein. A typical prior art cutting head requires 1–5 minutes for disassembling and re-stringing. For a commercial gardener who spends eight to ten hours a day using a string trimmer, an hour or more may be wasted for re-stringing.

A second type of string trimmer cutting head design includes a spool of string enclosed within the cutting head, where the string is paid out through peripheral apertures formed in the circumference of the cutting head as required, as disclosed by U.S. Pat. No. 3,708,967 to Geist, et al. entitled "ROTARY CUTTING ASSEMBLY" which issued Jan. 9, 1973, U.S. Pat. No. 4,301,642 to Thurber entitled "SAFETY ROTOR FOR MOWER" which issued Nov. 24, 1981, and U.S. Pat. No. 4,335,510 to Close, et al. entitled "STRING TRIMMER" which issued Jun. 22, 1982. The string is clamped within the cutting head to prevent unwanted extension therefrom. This cutting head design also has several drawbacks. A failure near an aperture may cause the end of the string to retract within the cutting head, thus requiring disassembly of the cutter head and re-threading of the string through the aperture. Although the cutting head may be designed to be readily removed, the common occurrence of a string failing adds up to a significant amount of time spent in disassembling the cutter head. Also, the operator of the string trimmer must carry the weight of an entire spool during the course of operation, which for a commercial gardener may be a substantial time and even an entire work day, resulting in a strenuous effort.

To overcome some of the shortcomings of the prior art, a third type of string trimmer cutter head design avoids the need for disassembly of the cutter head to accomplish re-stringing. For example, U.S. Pat. No. 4,756,146 to Rouse entitled "STRING TRIMMER HEAD AND METHOD" which issued Jul. 12, 1988 includes four arcuate channels, each extending between two points on the periphery of the cutting head. The channels are disposed in pairs so that each pair of channels frictionally engages a string. The string is secured to the cutter head with one end of the string being fed through each channel from a point external to the cutting head and with the ends being pulled through the channels so that the intermediate portion of the string comes into contact with a portion of the periphery of the cutting head disposed between the channels. Another example of the third type of cutting head design is disclosed in U.S. Pat. No. 5,398,416 to Mackey entitled "UNIVERSAL STRING TRIMMER REPLACEMENT HEAD" which issued Mar. 21, 1995 and which discloses a cylindrical block formed with two non-parallel channels. A string is secured in the Mackey cutting head through a series of bends with the string passing through the channels and engaging portions of the outer surface of the cutting head. Although these references avoid the requirement of disassembling a cutter head during the re-stringing process, the required number of bends and threading disclosed in these references is also time-consuming. Due to the shortcomings of the prior art, there is a need for a string trimmer cutting head which may be quickly re-strung.

It is an object of this invention to provide a string trimmer cutting head which is easily and quickly re-strung.

It is also an object of this invention to provide a string trimmer cutting head which can be easily and quickly strung with any gauge string.

It is a further object of this invention to provide a string trimmer cutting head with a centrifugally-driven clamping mechanism for holding the string within the cutting head which allows easy re-stringing of the cutting head.

It is yet another object of this invention to provide a lightweight string trimmer cutting head which contains an amount of string needed only for operation.

It is also another object of this invention to provide a string trimmer cutting head which can be re-strung without disassembly or bending and twisting of the string within the cutting head.

SUMMARY OF THE INVENTION

The above-stated objects are met by a new and improved string trimmer cutting head which can be easily and quickly re-strung and is capable of using thin, as well as thick, gauge string.

The cutting head of the subject invention preferably includes a substantially cylindrical body having a disc-shaped base plate formed to define a central drive shaft aperture and a surrounding side wall. A plurality of slots are formed in the side wall with a radially inward extending pressing wall forming one edge of each of the slots. A clamping member is pivotally mounted adjacent each aperture, opposite the corresponding pressing wall so that its center of gravity is disposed between the pivotal mounting and the corresponding pressing wall. The clamping members are adapted and formed to generate two degrees of clamping force in cooperation with the corresponding pressing walls. Springs are provided to generate one degree of clamping force, wherein the clamping force is sufficient to grippingly engage and maintain strings within the cutting head while not in use. A second and greater degree of clamping force is generated with the cutting head being in use, wherein the rotation of the cutting head creates centrifugal force that acts on the centers of gravity of the clamping members and enhances the gripping force thereof. The lesser degree of clamping force can be overcome by a string forcibly introduced from a location outside the cutting head, through the aperture and between the clamping member and the pressing wall. During operation, the clamping members are rigidly locked into a clamping position from which the greater degree of clamping force is generated. Since string may be threaded through the apertures from a location outside the cutting head, no time-consuming disassembly of the cutting head is required to re-string the cutting head upon failure of a string. An operator of the subject invention may carry a bundle of strings pre-cut to a pre-determined length which can be easily threaded into the cutting head as needed.

In the preferred embodiment, the clamping members are formed with a cam shape, and springs are provided to urge the cam-shaped clamping members into contact with the corresponding pressing wall. Each cam-shaped clamping member is formed and disposed with its center of gravity being located between the pressing wall and the pivotal mounting. The springs generate the lesser degree of clamping force through the urging of the clamping members into contact with the corresponding pressing walls. During operation, the centrifugal force generated by the rotation of the cutting head acts on the centers of gravity of the clamping members, with resulting torques being generated in the clamping members about the pivotal mountings. Due to the location of the centers of gravity, the torque generated in each clamping member forces the clamping member into greater engagement with the corresponding pressing wall, thereby increasing the clamping force generated by the clamping members and the pressing walls.

The apertures, pressing walls and clamping members are dimensioned to accommodate thin, as well as thick, gauge string. Thus, the new and improved cutting head of the subject invention is capable of accommodating relatively strong strings which reduce likelihood of failure. The accommodation of thicker strings, which reduces the number of failures, and the ease of re-threading reduce an operator's lost time spent on re-stringing a string trimmer.

In an alternative embodiment of the invention, a resilient collet can be utilized to grip the string. The collet is formed with a plurality of cantilevered arms, wherein the arms collectively define an opening. A spring-biased collar is provided to urge the arms radially inwardly to decrease the size of the opening. A string passing through the opening will be gripped by the cantilevered arms and maintained there due to the spring force being applied to the collet by the collar. Upon rotation of the cutting head, centrifugal force will urge the collar in a radially outward direction relative to the head, resulting in enhancement of the gripping force applied to the string.

Additionally, the cutting head of the subject invention need not be formed with a clamping member which is reactive to centrifugal force. A clamping member capable of pinching the string with sufficient pinching force to prevent the string from slipping out of the cutting head may be utilized. The pinching force is uniformly applied to the string, without being affected by centrifugal force generated during operation of the cutting head.

These and other features of the invention will be better understood through a study of the following detailed description of the invention and the accompanying drawings.

DETAILED DESCRIPTION OF THE PREFERRED EMBODIMENTS

Figure 1:
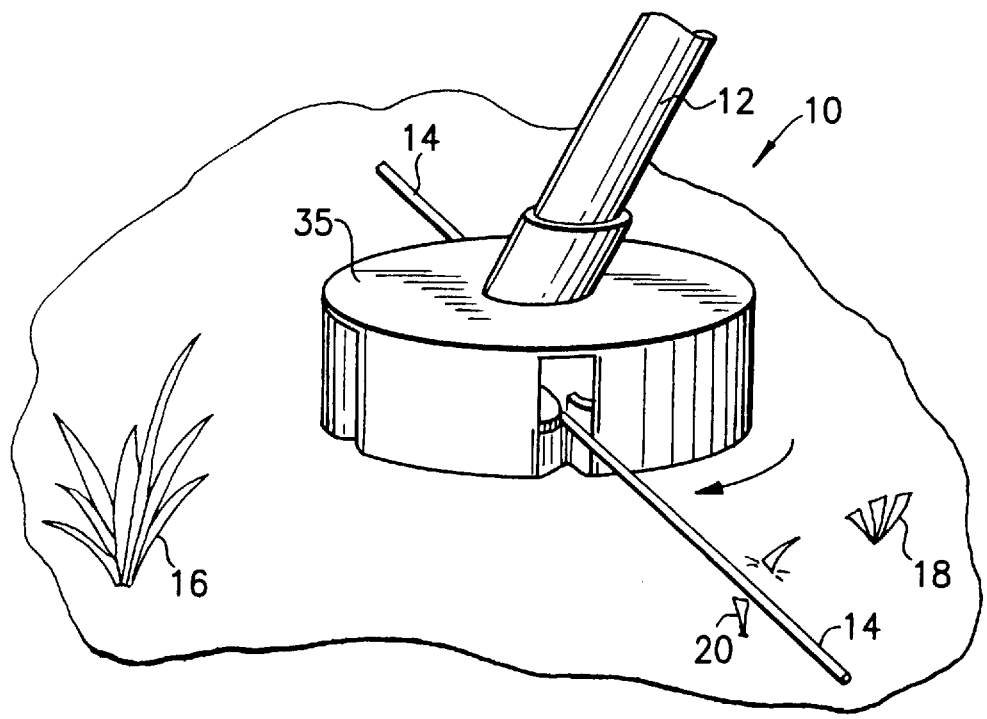
FIG. 1 is a perspective view of the new and improved cutting head of the subject invention.

Referring to FIG. 1, the cutter head 10 is rotationally driven by a motor, not shown, through a drive shaft 12 which spins strings 14 at a velocity sufficient to cut vegetation. Unkept vegetation, such as a tuft of grass 16, may be cut to a desired height as shown by tuft 18 and blade of grass 20.

Figure 2:
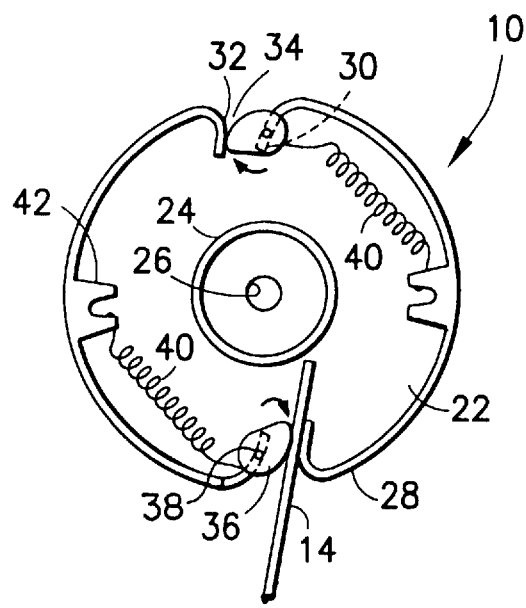
FIG. 2 is a plan view of the new and improved cutting head of the subject invention.

FIG. 2 more clearly shows the preferred embodiment of the cutting head 10 which includes a disc-shaped base plate 22 formed with a central hub 24. The base plate 22 is preferably formed with a circular shape. Alternatively, the base plate 22 can be formed with any shape that allows the base plate 22 to rotate about its center in a balanced state. For example, the base plate 22 can be formed as a rectangle or a star with equally-spaced points. Also, the cutting head 10 can be formed to various sizes by cutting the base plate 22 to the desired dimensions.

The hub 24 is frustoconically shaped and extends from the base plate 22 in a single direction. A drive shaft aperture 26 is formed in the hub 24 and dimensioned to allow a drive shaft to pass therethrough. The drive shaft may be secured to the hub 24 in the void formed by the hub 24 above the plane of the base plate 22. A side wall 28 also extends from the base plate 22 in the same direction as the hub 24 to a height equal to or greater than the height of the hub 24. The side wall 28 is discontinuous with edges 30 and pressing walls 32 forming the ends of each length of the side wall 28.

The edges 30 and the pressing walls 32 both extend radially inward towards the hub 24 with the pressing walls 32 having a height equal to that of the side wall 28. The edges 30 are formed with a height, as measured from the base plate 22, considerably less than the side wall 28. The edges 30 and the pressing walls 32 are disposed to define apertures 34 at opposing locations in the side wall 28. The apertures 34 are each formed with a width capable of accommodating the string 14 embodying any commonly used thickness. The side wall 28 may be formed with any number of the apertures 34, so long the apertures 34 are disposed at equal intervals along the length of the side wall 28. The equal spacing of the apertures 34 is required to maintain the cutting head 10 balanced as the cutting head 10 rotates during use. As shown in FIG. 1, a cover 35 is provided which is formed to engage the side wall 28 opposite the base plate 22 and prevent the introduction of dirt and debris into the cutting head 10. The cover 35 is formed to allow a drive shaft to pass therethrough.

Figure 3:
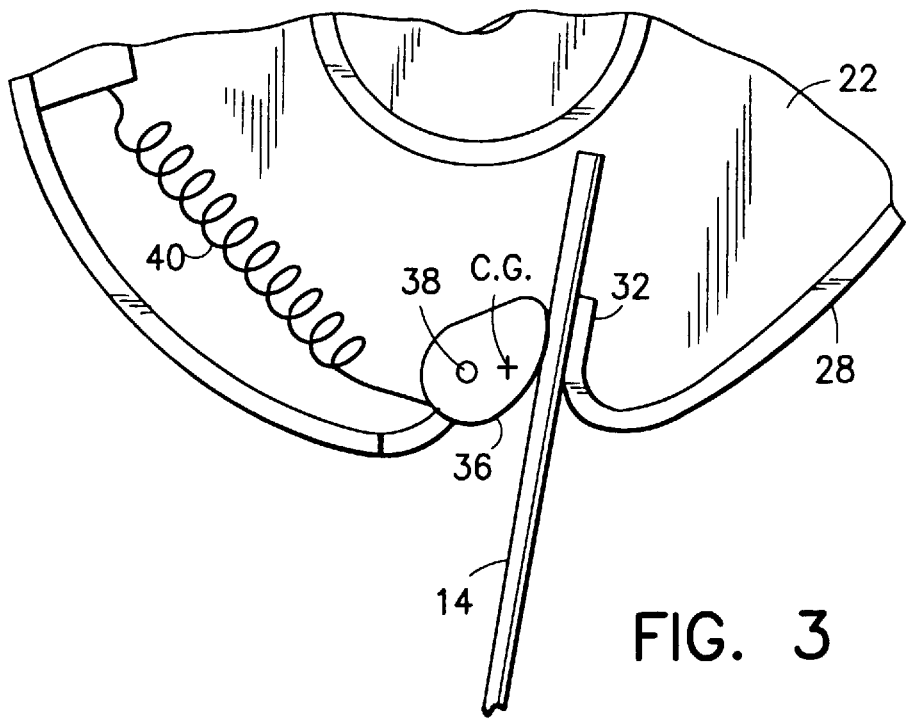
FIG. 3 is a partial view of a string clamped by the new and improved cutting head of the subject invention.

Referring to FIG. 2, cams 36 are pivotally mounted to post 38 which extend from the edges 30. The cams 36 are mounted so that the top surface of the cams is below the height of the pressing walls 32. Springs 40 are provided to bias the cams 36, with each of the springs 40 having one end secured to one of the cams 36 and a second end secured to a bracket 42 formed in the side wall 28. The cams 36 are formed and mounted onto the posts 38 so that the center of gravity of each of the cams 36 is located at a point between the corresponding post 38 and the pressing wall 32, as shown in FIG. 3 with the center of gravity indicated by "C.G.". The springs 40 are secured to the cams 36 such that the cams 36 are urged in a clockwise direction into contact with the pressing wall 32, as shown in FIG. 2. The springs 40 create the lesser degree of clamping force which is capable of maintaining the string 14 between the cam 36 in the pressing wall 32. The spring force of the spring 40 is selected to allow counter-clockwise rotation of the cams 36 with the insertion of the strings 14 into the cutting head 10 from a location outside the side wall 28. The rotation of the cutting head 10 during use, in either a clockwise or counter-clockwise direction, creates a centrifugal force which acts on the centers of gravity of the cams 36 and creates torque about the posts 38 which cause the cams 36 to come into tighter engagement with the strings 14. Also, the centrifugal force radially extends the strings 14 and causes a thinning effect with the cross-section of the strings 14 being slightly reduced, thereby allowing the springs 40 and the torque acting on the cams 36 to urge the cams 36 into closer engagement with the pressing walls 32 and create an even tighter engagement of the cams 36 and the pressing walls 32 about the strings 14.

In operation, the cutting head 10 is mounted onto a rotational drive shaft which passes through the cover 35 and the drive shaft aperture 26 with the drive shaft being secured to the hub 24. One end of the string 14 is guided through one of the apertures 34 formed in the side wall 28 and forced between the cam 36 and the pressing wall 32. The passage of the string 14 between the cam 36 and the pressing wall 32 causes the cam to rotate in a counter-clockwise direction. Once the string 14 is forced into the cutting head 10, no further force is required and the spring 40 urges the cam 36 into clockwise rotation, resulting in the string 14 being clamped between the cam 36 and the pressing wall 32. The string 14 cannot be easily pulled out of the cutting head 10 since a force acting on the string 14 in a radially outward direction will also act on the cam 36 to cause it to rotate further clockwise and create a greater clamping force.

With the cutting head 10 rotating in either direction, the clamping force is enhanced due to centrifugal force created by the rotation of the cutting head 10 acting on the centers of gravity of the cams 36, which in turn, create torque about the post 38 and cause the cams 36 to come into tighter engagement with the strings 14. If one of the strings 14 fails during use, an operator of the cutting head 10 merely has to force a new string into the cutting head 10. The subject invention does not require disassembly of the cutting head 10 to accomplish re-threading. The ends of the broken string are merely forced into the cutting head 10 without affecting the operation of the cutting head 10. Periodically, the cutting head 10 may be opened to dispose of the fragments of broken string.

Figure 4:
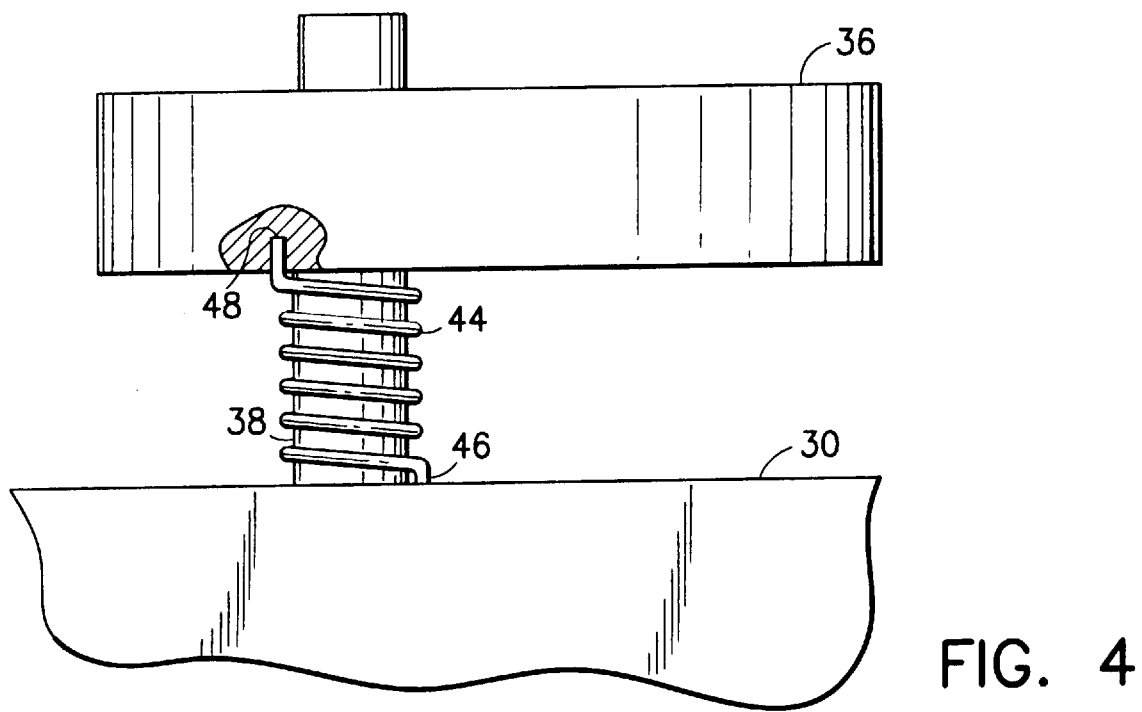
FIG. 4 is a partial view of a second embodiment of the new and improved cutting head of the subject invention.

In a second embodiment, torsional springs 44 may be employed about the posts 38 as shown in FIG. 4 in place of the coil springs 40. One end 46 of the torsional spring 44 is secured to the edge 30 with the other end 48 being secured to the cam 36 as shown in the cut-away section of FIG. 4. The end 48 urges the cam 36 in a clockwise direction about the post 38, with the operation of the second embodiment of the subject invention being similar to that described above.

Figure 5:
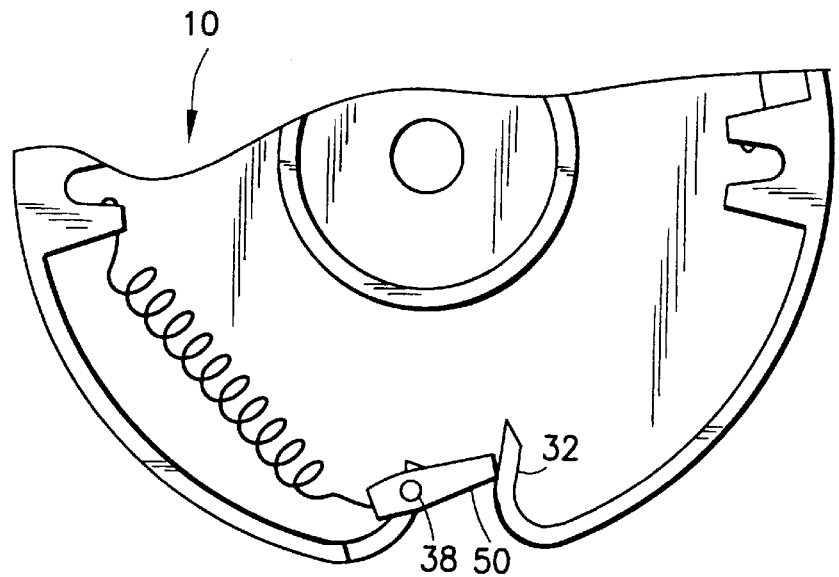
FIG. 5 is a partial view of a third embodiment of the new and improved cutting head of the subject invention.

Alternatively, the cam 36 can be substituted for a different-shaped clamping member. As shown in FIG. 5, a cylindrical rod 50 may be pivotally mounted to the post 38 with its center of gravity located between the post 38 and the pressing wall 32. Any shaped clamping member may be used with the subject invention so long as it is formed with its center of gravity disposed between the post 38 and the pressing wall 32 and comprises an edge or face which can cooperate with the pressing wall 32 to clamp the string 14. The combination of the clamping member and the pressing wall 32 collectively defines a clamping means.

Figure 6:
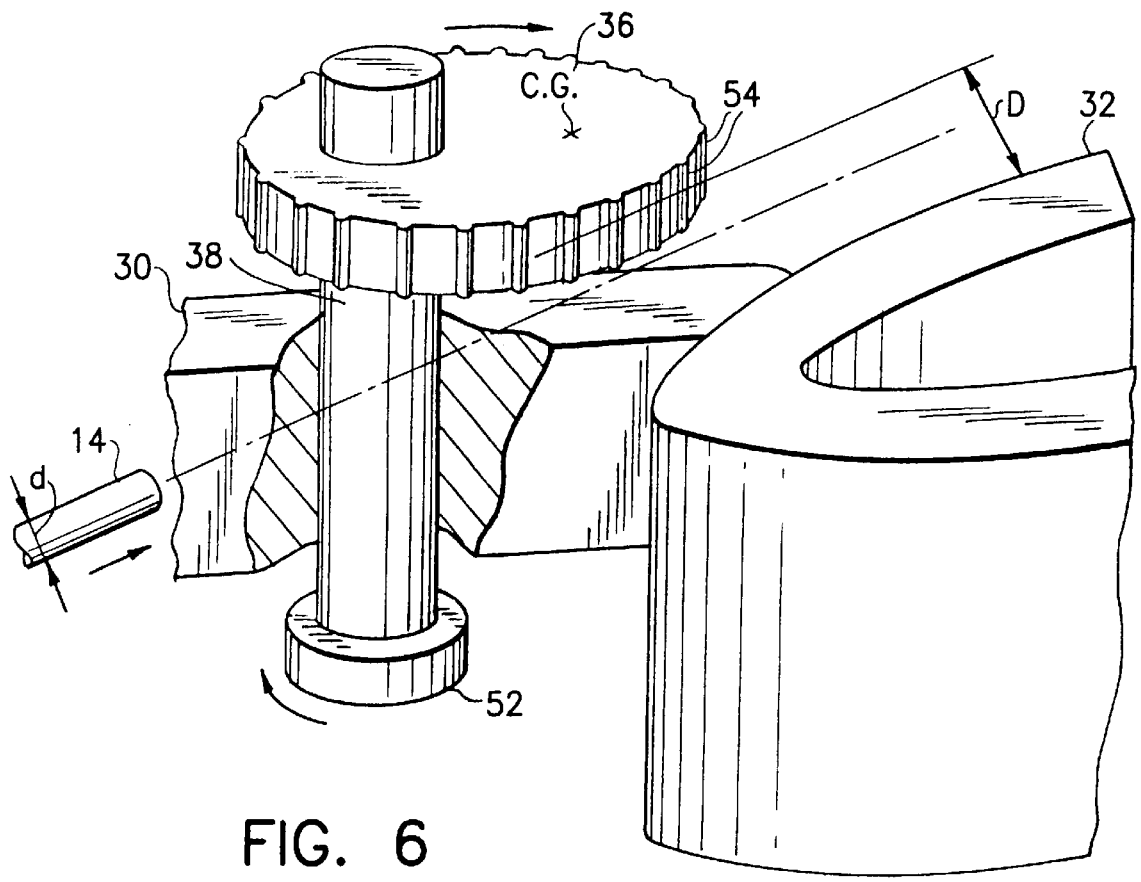
FIG. 6 is a partial view of a fourth embodiment of the new and improved cutting head of the subject invention.

In a fourth embodiment, the cutting head 10 may be formed with the cams 36 capable of frictionally engaging the strings 14 without the use of springs 40. As shown in FIG. 6, the post 38 may extend through the edge 30, or through the cover 35, not shown. A handle 52 is provided at the end of the post 38 opposite the cams 36. The cam 36 may be manually rotated about the post 38 by rotating the handle 52. The cam 36 forms an opening with the pressing wall having a width "D" which may be varied. The width "D" is measured between the closest points of the cam 36 and the pressing wall 32 and represents the narrowest cross-section of the opening. The string 14 is formed with a diameter "d". To dispose the string 14 within the cutting head 10, the cam 36 is rotated so that the width "D" of the opening is greater than the diameter "d" of the string 14. Once within the cutting head 10, the cam 36 is rotated to frictionally engage the string 14 and press the string 14 against the pressing wall 32, with the width "D" being less than the diameter "d" of the string 14. A plurality of spaced ribs 54 may be provided to enhance the frictional engagement of the cam 36 with the string 14. In use, the centrifugal force created by the rotation of the cutting head 10 acts on the center of gravity of the cam 36, indicated by "C.G.", to enhance the gripping engagement of the string 14. The rotation of the cutting head 10 causes the cam 36 to create a moment about the post 38 and clamp string 14 in tighter engagement. Also, the cams 36 can be substituted for different-shaped clamping member which is formed with a center of gravity disposed between the post 38 and the pressing wall 32 during use and comprise an edge or face which can frictionally engage the string 14.

Figure 7:
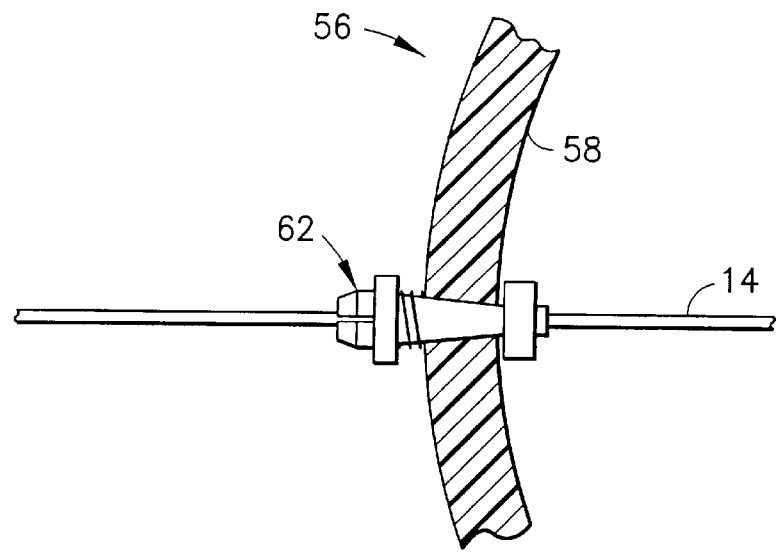
FIG. 7 is a plan view, partially in cross-section, of a fifth embodiment of the new and improved cutting head of the subject invention.
Figure 8:
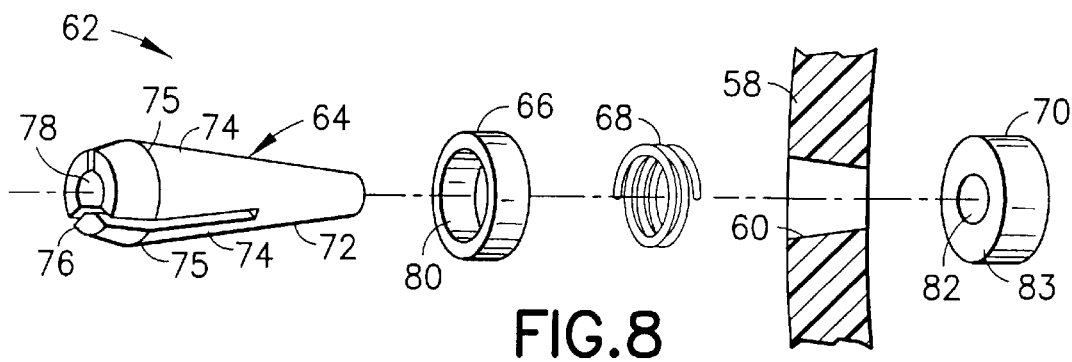
FIG. 8 is an exploded view of the clamping mechanism of the fifth embodiment of the new and improved cutting head of the subject invention.

Referring to FIGS. 7 and 8, a fifth embodiment of the subject invention is depicted therein and generally designated with the reference numeral 56. The cutting head 56, generally formed as the cutting head 10 described above, is formed with a side wall 58 having a plurality of tapered apertures 60 formed therethrough. As described with respect to the apertures 34 above, the apertures 60 are preferably evenly spaced along the length of the side wall 58 to ensure balance of the cutting head during rotation. A clamping mechanism 62 is provided for securely engaging the string 14 through each of the apertures 60.

As more clearly shown in FIG. 8, the clamping mechanism 62 includes a collet 64, a tubular collar 66, a spring 68 and a lock 70. The collet 64 is formed with a tapered body 72 from which a plurality of cantilevered arms 74 extend. The cantilevered arms 74 are each formed with an arcuate clamping edge 76, wherein the clamping edges 76 collectively define a circular opening. The collet 64 is generally tubular shaped, having a passage 78 extending from the opening defined by the clamping edges 76 and through the body 72. The passage 78 is dimensioned to accommodate the string 14. The cantilevered arms 74 are circumferentially spaced such that movement of the arms 74 in radially inward directions will cause the opening defined by the clamping edges 76, and thus the dimensions of a portion of the passage 78, to be decreased. The dimensions of the portion of the passage 78 which coextends with the body 72 cannot, however, be altered. Preferably, the aperture 60 defined in the side wall 58 is formed with the same angle of taper as the body 72, to prevent movement of the collet 64 in a radially inward direction relative to the cutting head 56. The cantilevered arms 74 are each formed with a tapered, raised portion 75, wherein the raised portions 75 collectively define the largest diameter of the collet 64. The collar 66 is formed with an inner surface 80 dimensioned to allow passage of the body 72 of the collet 64 therethrough but not the raised portions 75 of the cantilevered arms 74.

In assembling the clamping mechanism 62, the collet 64 is passed through the collar 66, through the spring 68, and through the aperture 60. The lock 70 is securely mounted to the body 72 of the collet 64 to maintain the entire clamping mechanism 62 in engagement with the aperture 60. The lock 70 has an annular shape, with a central passage 82 dimensioned to securely engage the collet 64. The lock 70 is also formed with a pressing surface 83 dimensioned for engagement with the side wall 58. When assembled, the spring 68 is in pressing engagement with the side wall 58 and urges the collar 66 in a radially outward direction, relative to the cutting head 56. Thus, the inner surface 80 of the collar 66 comes into engagement with the raised portions 75 of the cantilevered arms 74 and bends the arms 74 radially inwardly. The string 14 is passed through the collet 64 and, with the cantilevered arms 74 being bent radially inwardly, the clamping edges 76 will grippingly engage the string 14. To insert the string 14 into the clamping mechanism 62, one end of the string 14 is forced through the opening defined by the clamping edges 76 and through the passage 78 of the collet 64. The force applied to the string 14 will urge the cantilevered arms 74 in radially outward directions, simultaneously causing the collar 66 to be urged in a radially inward direction, relative to the cutting head 56, against the spring 68. With the string 14 being inserted into the cutting head 56, rotation of the cutting head 56 will generate centrifugal force that will urge the collar 66 in a radially outward direction, relative to the cutting head 56, causing the collar 66 to further urge the cantilevered arms 74 radially inwardly. Thus, rotation of the cutting head 56 will enhance the gripping force applied to the string 14 by the clamping edges 76.

Figure 9:
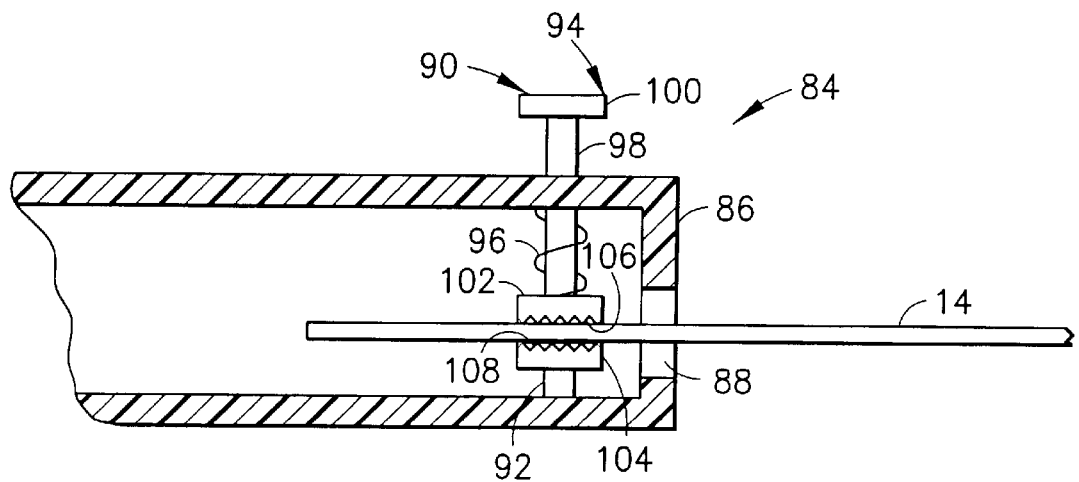
FIG. 9 is an elevated view, partially in cross-section, of a sixth embodiment of the new and improved cutting head of the subject invention.

It can be appreciated that the cutting head of the subject invention can be formed to merely pinch the string 14 and not be affected by centrifugal force. Referring to FIG. 9, a sixth embodiment of the subject invention is shown therein and generally designated with the reference numeral 84. The cutting head 84 is generally shaped as the cutting head 10, described above, and includes a side wall 86 having a plurality of apertures 88 formed therethrough. Again, as with the other embodiments of the invention, the apertures 88 are preferably evenly spaced along the length of the side wall 86.

The cutting head 84 is formed with a pinching mechanism 90 for grippingly engage the string 14. The pinching mechanism 90 is not responsive to centrifugal force generated by the rotation of the cutting head 84. Rather, the pinching mechanism 90 generates a pinching force which is uniformly applied to the string 14 at all times. An exemplary embodiment of the pinching mechanism 90 is shown in FIG. 9. The pinching mechanism 90 includes a base member 92, rigidly secured to the cutting head 84, a sliding actuator member 94 and a spring 96 for urging the actuator member 94 towards the base member 92. The actuator member 94 is formed with a shank 98 dimensioned to allow the actuator member 94 to extend through an aperture formed in the cutting head 84. Preferably, a handle 100 is mounted to the end of the shank 98. A shoe 102 and 104 is mounted to both the base member 92 and to the actuator member 94 respectively. The spring 96 is disposed about the shank 98 and in engagement with the cutting head 84 and the shoe 102 to urge the shoe 102 towards the shoe 104. The shoes 102 and 104 are preferably formed with surfaces 106 and 108, respectively, for engaging the string 14. The surfaces 106 and 108 may be formed with irregular patterns to enhance frictional forces generated through the engagement of the string 14 by the shoes 102 and 104. For example, as shown in FIG. 9, the surfaces 106 and 108 may be formed with a plurality of ridges.

In use, the actuator member 94 is urged away from the base member 92 by applying a pulling force to the handle 94 in a direction away from the cutting head 84. As such, the shoes 102 and 104 will be spaced apart, and the string 14 may be disposed through the aperture 88 and between the shoes 102 and 104. Thereafter, the pulling force may be removed from the actuator member 94, and the shoes 102 and 104, due to the spring force generated by the spring 96, will pinch the string 14. The pinching force applied to the string 14 will be uniformly applied at all times, and unaffected by rotation of the cutting head 84.

As is readily apparent, numerous modifications and changes may readily occur to those skilled in the art, and hence it is not desired to limit the invention to the exact construction and operation shown and described, and accordingly all suitable modification equivalents may be resorted to falling within the scope of the invention as claimed.

What is claimed is:

1. A combination of a cutting head and string for cutting and trimming vegetation, said combination being selectively rotationally driven through a drive shaft, said combination comprising:

at least one generally straight length of string, each said string having two ends and an intermediate portion extending therebetween;

a cutting head selectively rotationally driven by the drive shaft, said head having a base plate and a side wall, said base plate defining a periphery, said side wall extending from said periphery, said base plate and said side wall collectively defining a volume, said side wall being formed with at least one aperture corresponding to each said string, wherein each said string is disposed to extend through a single said aperture with one said end of each said string being disposed in said volume defined by said base plate and said side wall; and at least one pinching means for selectively fixing each said string to said head, said pinching means adapted to apply a uniform pinching force to said string.

2. A combination as in claim 1, wherein each said pinching means includes a first shoe and a second shoe, said shoes collectively pinching said string.

3. A combination as in claim 2, wherein said shoes apply said pinching force in a direction parallel to the axis of rotation of said cutting head.

4. A combination as in claim 2, wherein each said shoe is formed with a contact surface for engaging said string, said contact surface being irregularly shaped.

5. A combination as in claim 2, wherein each said pinching means further includes a biasing means for urging said first shoe towards said second shoe.

6. A cutting head for a string trimmer, said cutting head for accommodating at least one piece of string, the string being fixedly supported in said cutting head, said cutting head comprising:

a base plate, said base plate defining a periphery;

a side wall extending from the periphery of said base plate, said side wall formed to define at least one aperture;

a collet rigidly mounted through each said aperture, each said collet having a plurality of circumferentially spaced, cantilevered arms and an inner surface defining a passage extending the entire length thereof, said passage dimensioned to accommodate the string; and a control means corresponding to each said collet, said control means for selectively urging said cantilevered arms of respective said collet in radial inward directions to alter the dimensions of a portion of said passage, whereby said cantilevered arms of each said collet grippingly engage the respective string to securely fix the string to the cutting head.

7. A cutting head as in claim 6, wherein each said collet is formed with a tapered portion, and wherein each said aperture is tapered to engage said tapered portion of respective said collet in face-to-face engagement.

8. A cutting head as in claim 6, wherein said cantilevered arms of each said collet is each formed with a tapered raised portion, said raised portions collectively defining the largest outer diameter of respective said collet.

9. A cutting head as in claim 8, wherein each said control means includes a tubular collar slidably mounted on respective said collet, and a biasing means for urging said collar away from said side wall and into engagement with said raised portions of said cantilevered arms of respective said collet.

* * * * *